(12) United States Patent
Lin et al.

(10) Patent No.: US 12,293,545 B2
(45) Date of Patent: May 6, 2025

(54) OCCUPANT HEAD POSITION IN VEHICLE

(71) Applicant: Ford Global Technologies, LLC, Dearborn, MI (US)

(72) Inventors: Jun Lin, Westland, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 18/159,705

(22) Filed: Jan. 26, 2023

(65) Prior Publication Data
US 2024/0257389 A1  Aug. 1, 2024

(51) Int. Cl.
| G06T 7/73 | (2017.01) |
| B60R 11/04 | (2006.01) |
| B60R 21/015 | (2006.01) |
| B60R 21/16 | (2006.01) |
| H04N 23/90 | (2023.01) |
| B60R 11/00 | (2006.01) |

(52) U.S. Cl.
CPC ............... G06T 7/74 (2017.01); B60R 11/04 (2013.01); B60R 21/01552 (2014.10); B60R 21/16 (2013.01); H04N 23/90 (2023.01); *B60R 2011/0028* (2013.01); *G06T 2207/30196* (2013.01); *G06T 2207/30244* (2013.01); *G06T 2207/30268* (2013.01)

(58) Field of Classification Search
CPC ..... G06T 7/74; B60R 21/01552; B60R 11/04; B60R 21/16; H04N 23/90
USPC .......................................................... 348/148
See application file for complete search history.

(56) References Cited

U.S. PATENT DOCUMENTS

| 8,339,459 | B2 | 12/2012 | Zhang et al. | |
| 11,922,568 | B2* | 3/2024 | van Antwerpen | ... H04N 13/275 |
| 2006/0018518 | A1* | 1/2006 | Fritzsche | .......... B60R 21/01552 |
| | | | | 382/116 |
| 2008/0285799 | A1* | 11/2008 | Chiu | ..................... G06V 20/58 |
| | | | | 382/103 |
| 2013/0088578 | A1* | 4/2013 | Umezawa | ............ G06V 20/588 |
| | | | | 348/47 |
| 2013/0141547 | A1* | 6/2013 | Shimizu | .................... G06T 3/12 |
| | | | | 348/48 |

(Continued)

FOREIGN PATENT DOCUMENTS

| EP | 1069001 A1 | 1/2001 |
| KR | 101647803 B1 | 8/2016 |

OTHER PUBLICATIONS

Akimoto et al., "Automatic Creation of 3D Facial Models", IEEE Computer Graphics & Applications. Sep. 1999.

*Primary Examiner* — Matthew David Kim
(74) *Attorney, Agent, or Firm* — Frank Lollo; Brooks Kushman P.C.

(57) ABSTRACT

A computer includes a processor and a memory, and the memory stores instructions executable by the processor to receive a first image frame from a first camera of a vehicle and a second image frame from a second camera of the vehicle, identify a common point in the first image frame and the second image frame, determine a projected position of the common point projected onto a plane based on the first image frame and the second image frame, and determine a position of the common point based on the projected position. A first optical axis defined by the first camera and a second optical axis defined by the second camera are in the plane.

20 Claims, 6 Drawing Sheets

(56) References Cited

U.S. PATENT DOCUMENTS

| | | | | |
|---|---|---|---|---|
| 2014/0043444 | A1* | 2/2014 | Haraguchi | G01B 11/03 |
| | | | | 348/47 |
| 2014/0098232 | A1* | 4/2014 | Koike | B60R 21/01552 |
| | | | | 348/148 |
| 2015/0124060 | A1* | 5/2015 | Hasegawa | H04N 13/239 |
| | | | | 348/47 |
| 2015/0358611 | A1* | 12/2015 | Cui | H04N 13/246 |
| | | | | 348/49 |
| 2017/0041585 | A1* | 2/2017 | Liu | H04N 13/271 |
| 2017/0318275 | A1* | 11/2017 | Khalid | H04N 23/698 |
| 2017/0339395 | A1* | 11/2017 | Hall | H04N 13/111 |
| 2017/0366797 | A1* | 12/2017 | Kim | H04N 13/128 |
| 2019/0392609 | A1* | 12/2019 | Bae | G06T 7/74 |
| 2023/0088530 | A1* | 3/2023 | Zhang | G06T 7/73 |
| | | | | 381/303 |
| 2023/0106443 | A1* | 4/2023 | Kurotobi | G01S 7/4802 |
| | | | | 382/103 |

* cited by examiner

OCCUPANT HEAD POSITION IN VEHICLE

BACKGROUND

Vehicles are equipped with airbags. In the event of certain impacts, an inflator activates and provides inflation medium to the airbags, and the airbags pressurize and help restrain occupants. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

Figure 1:
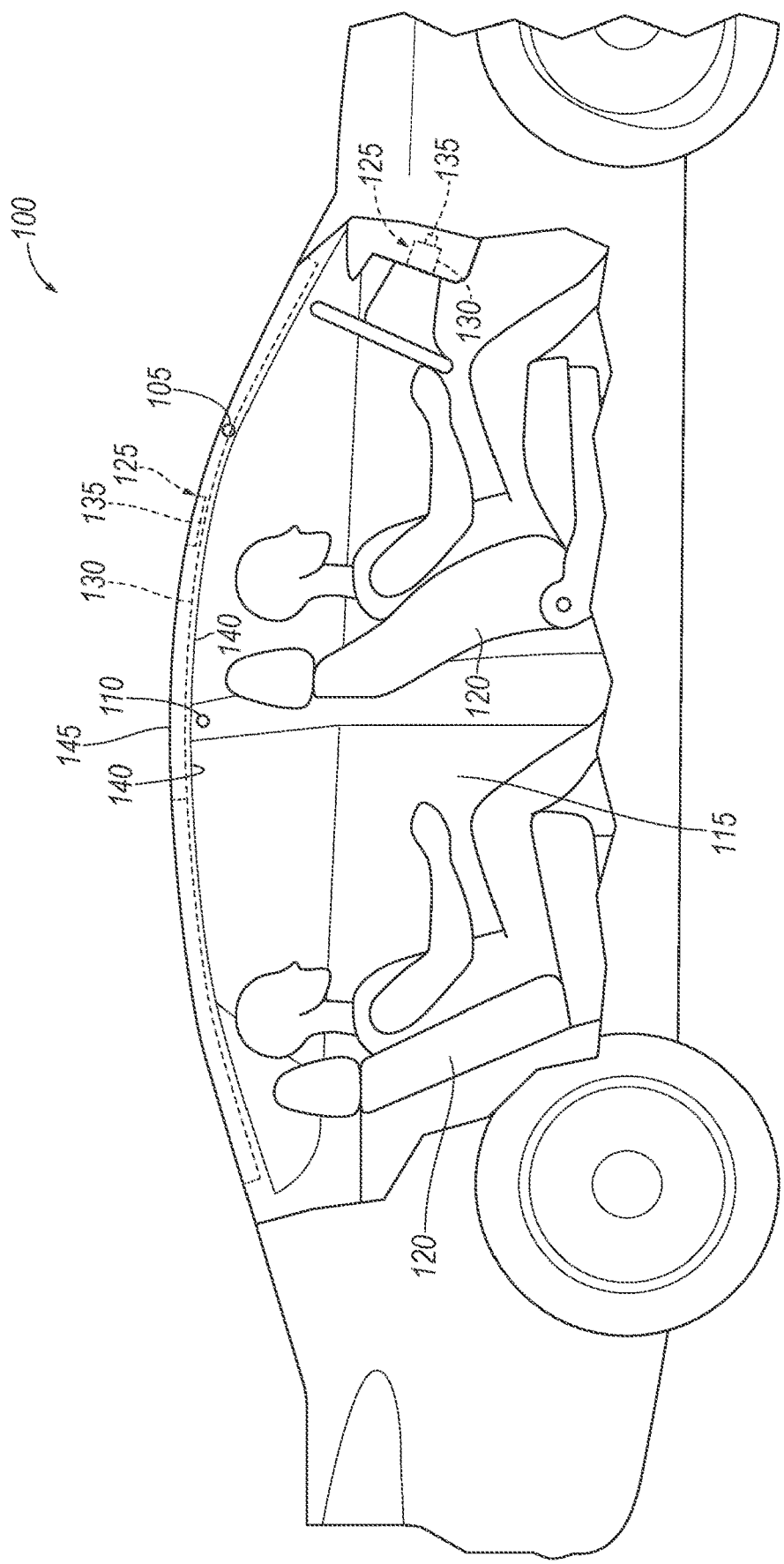
FIG. 1 is a side view of an example vehicle with a passenger cabin exposed for illustration.

This disclosure describes techniques for determining a position of a point that is visible to two cameras. For example, the point may be on a head of an occupant of a vehicle, and a component of the vehicle such as an airbag may be actuated based on the position of the point. Unlike stereoscopic cameras, the techniques herein do not require the cameras to have parallel optical axes. The optical axes of the cameras are in a common plane and may intersect each other, i.e., may be nonparallel. Such nonstereo cameras may be installed in a vehicle for other purposes, e.g., driver state monitoring, so the techniques herein may permit the determination of the position of a head of the occupant without additional hardware such as stereo cameras or range sensors. A computer is programmed to receive a first image frame from a first camera of a vehicle and a second image frame from a second camera of the vehicle, identify a common point in the first image frame and the second image frame, determine a projected position of the common point projected onto the plane defined by the optical axes based on the first image frame and the second image frame, and determine a position of the common point based on the projected position. With that position, if certain impacts occur, the timing of the deployment of the airbag relative to the event can be adjusted, e.g., sooner after the event when the head of the occupant is closer to the deployed position of the airbag, e.g., when the head is farther forward for a driver airbag or passenger airbag or farther outboard for a side air curtain. For another example, the position of the common point may be used to adjust a location at which a heads-up display is projected onto a windshield, e.g., higher up when the occupant is taller.

A computer includes a processor and a memory, and the memory stores instructions executable by the processor to receive a first image frame from a first camera of a vehicle and a second image frame from a second camera of the vehicle, identify a common point in the first image frame and the second image frame, determine a projected position of the common point projected onto a plane based on the first image frame and the second image frame, and determine a position of the common point based on the projected position. A first optical axis defined by the first camera and a second optical axis defined by the second camera are in the plane.

In an example, the instructions may further include instructions to actuate a component of the vehicle based on the position of the common point. In a further example, the component may be an airbag. In a yet further example, the instructions may further include instructions to determine a time at which to inflate the airbag based on the position of the common point.

In an example, the common point may be on a head of an occupant of the vehicle.

In an example, the first camera and the second camera may be disposed in a passenger cabin of the vehicle. In a further example, the first camera and the second camera may be disposed at a headliner of the vehicle and oriented partially downward.

In an example, the first optical axis and the second optical axis may be nonparallel. In a further example, the first camera and the second camera may be fixed relative to each other.

In an example, the instructions may further include instructions to determine a distance from a line connecting the first camera and the second camera to the projected position of the common point, and determine the projected position based on the distance. In a further example, the instructions to determine the distance may include instructions to calculate the distance from a geometrical formula. In a yet further example, the geometrical formula may include a distance between the first camera and the second camera divided by a denominator based on directions from the first camera and the second camera to the common point. In a still yet further example, the plane may include a first line extending from the first camera and a second line extending from the second camera, the first line and the second line may be parallel, and the denominator may be calculated using a first angle between the first line and a line from the first camera to the projected position and a second angle between the second line and a line from the second camera to the projected position.

In an example, the plane may include a first line extending from the first camera and a second line extending from the second camera, the first line and the second line may be parallel, and the instructions to determine the projected position may include instructions to determine the projected position based on a first angle between the first line and a line from the first camera to the projected position and a second angle between the second line and a line from the second camera to the projected position.

In an example, the instructions to determine the projected position may include instructions to determine the projected position based on prestored positions of the first camera and the second camera.

In an example, the instructions to determine the projected position may include instructions to determine the projected position based on prestored orientations of the first camera and the second camera.

In an example, the instructions to determine the projected position may include instructions to determine the projected position based on prestored focal lengths of the first camera and the second camera.

In an example, the position of the common point is represented as a three-dimensional coordinate in a reference frame relative to the vehicle.

In an example, a line between the projected position and the position may be orthogonal to the plane.

A method includes receiving a first image frame from a first camera of a vehicle and a second image frame from a second camera of the vehicle, identifying a common point in the first image frame and the second image frame, determining a projected position of the common point projected onto a plane based on the first image frame and the second image frame, and determining a position of the common point based on the projected position. A first optical axis defined by the first camera and a second optical axis defined by the second camera are in the plane.

With reference to the Figures, wherein like numerals indicate like parts throughout the several views, a computer 205 includes a processor and a memory, and the memory stores instructions executable by the processor to receive a first image frame 305 from a first camera 105 of a vehicle 100 and a second image frame 310 from a second camera 110 of the vehicle 100, identify a common point 315 in the first image frame 305 and the second image frame 310, determine a projected position 410 of the common point 315 projected onto a plane 405 based on the first image frame 305 and the second image frame 310, and determine a position 415 of the common point 315 based on the projected position 410. A first optical axis 420 defined by the first camera 105 and a second optical axis 425 defined by the second camera 110 are in the plane 405.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a passenger cabin 115 to house occupants, if any, of the vehicle 100. The passenger cabin 115 includes one or more seats 120 disposed in a front row of the passenger cabin 115 and/or in a second row behind the front row. The passenger cabin 115 may also include the seats 120 in a third-row (not shown) at a rear of the passenger cabin 115. The seats 120 are shown to be bucket seats in the front row and bench seats in the second row, but the seats 120 may be other types. The position and orientation of the seats 120 and components thereof may be adjustable by an occupant.

The vehicle 100 includes a plurality of airbag assemblies 125. The airbag assemblies 125 may include side air curtains, a driver airbag, a passenger airbag, etc. Each airbag assembly 125 is inflatable from an uninflated position to an inflated position. For example, the driver airbag may be inflatable from an uninflated position inside a steering wheel to an inflated position between the steering wheel and an occupant. The side air curtain may be inflatable from an uninflated position inside a roof rail 145 to an inflated position adjacent to side windows of the vehicle 100.

Airbags 130 of the airbag assemblies 125 may be formed of any suitable airbag material, for example, a woven polymer. For example, the airbags 130 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The airbag assemblies 125 include inflators 135 connected to the airbags 130 of each airbag assembly 125. Upon receiving a signal from, e.g., the computer 205, the inflators 135 may inflate the respective airbag 130 with an inflation medium, such as a gas. The inflators 135 may be, for example, pyrotechnic inflators that use a chemical reaction to drive inflation medium to the airbag assembly 125. The inflators 135 may be of any suitable type, for example, cold-gas inflators.

The first camera 105 and the second camera 110 can detect electromagnetic radiation in some range of wavelengths. For example, the cameras 105, 110 may detect visible light, infrared radiation, ultraviolet light, or some range of wavelengths including visible, infrared, and/or ultraviolet light. For example, the cameras 105, 110 can be charge-coupled devices (CCD), complementary metal oxide semiconductors (CMOS), or any other suitable type.

The cameras 105, 110 may be disposed in the passenger cabin 115. The cameras 105, 110 may be positioned to encompass occupants of the vehicle 100 in the fields of view of the cameras 105, 110, e.g., may encompass the seats 120 in the fields of view. For example, the cameras 105, 110 may be disposed at a headliner 140 of the vehicle 100, i.e., a ceiling of the passenger cabin 115, and oriented partially downward. The first camera 105 and the second camera 110 may be fixed relative to each other and fixed relative to the passenger cabin 115. The first camera 105 and the second camera 110 may define optical axes 420, 425 that are nonparallel. For example, the first camera 105 and the second camera 110 may be angled away from each other to collectively capture all the occupants, e.g., all the seats 120, of the passenger cabin 115.

Figure 2:
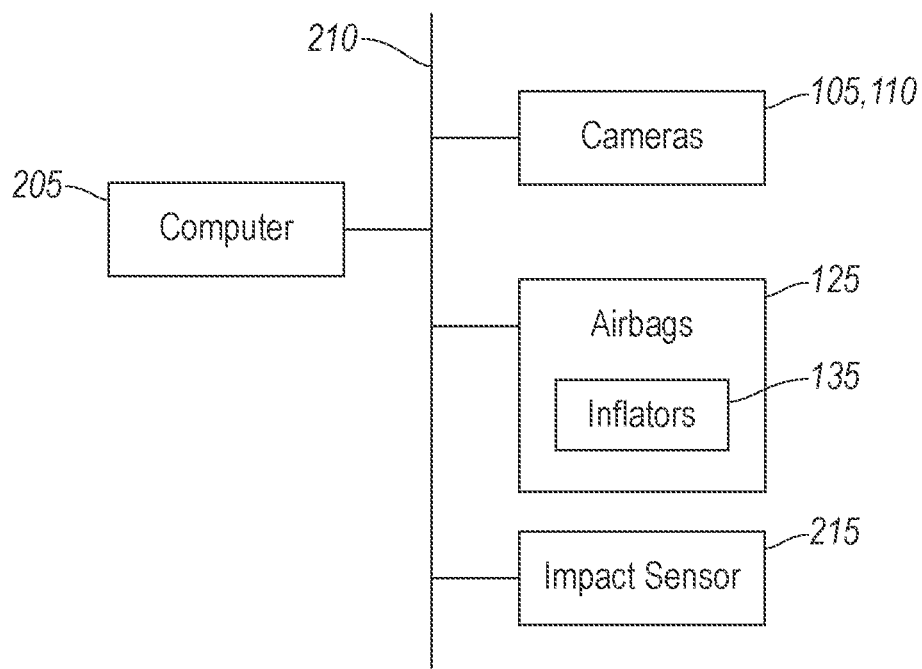
FIG. 2 is a block diagram of the vehicle.

With reference to FIG. 2, the computer 205 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 205 can thus include a processor, a memory, etc. The memory of the computer 205 can include media for storing instructions executable by the processor as well as for electronically storing data and/or databases, and/or the computer 205 can include structures such as the foregoing by which programming is provided. The computer 205 can be multiple computers coupled together.

The computer 205 may transmit and receive data through a communications network 210 such as a controller area network (CAN) bus, Ethernet, WiFi, Local Interconnect Network (LIN), onboard diagnostics connector (OBD-II), and/or by any other wired or wireless communications network. The computer 205 may be communicatively coupled to the cameras 105, 110, an impact sensor 215, the airbag assemblies 125 (e.g., the inflators 135), and other components via the communications network 210.

The impact sensor 215 is adapted to detect certain impacts to the vehicle 100. The impact sensor 215 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more external cameras, CCD image sensors, CMOS image sensors, etc. The impact sensor 215 may be located at numerous points in or on the vehicle 100.

In the event of certain impacts, the impact sensor 215 may respond by transmitting a signal through the communications network 210 to the computer 205. The computer 205 may transmit a signal through the communications network 210 to one or more of the inflators 135. The inflators 135 may discharge and inflate the respective airbags 130 of the airbag assemblies 125.

Figure 3A:
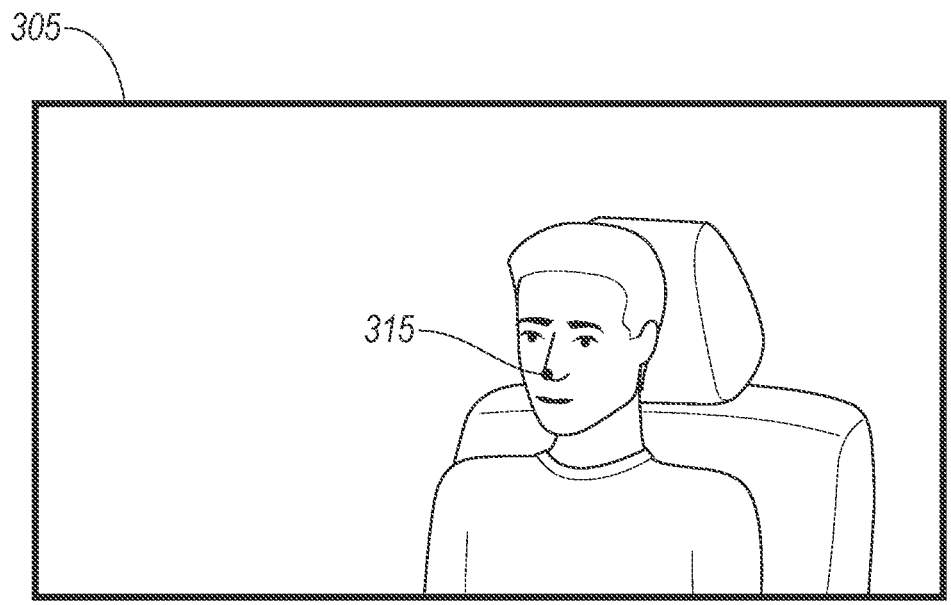
FIGS. 3A-B are diagrams of respective image data from the two cameras.
Figure 3B:
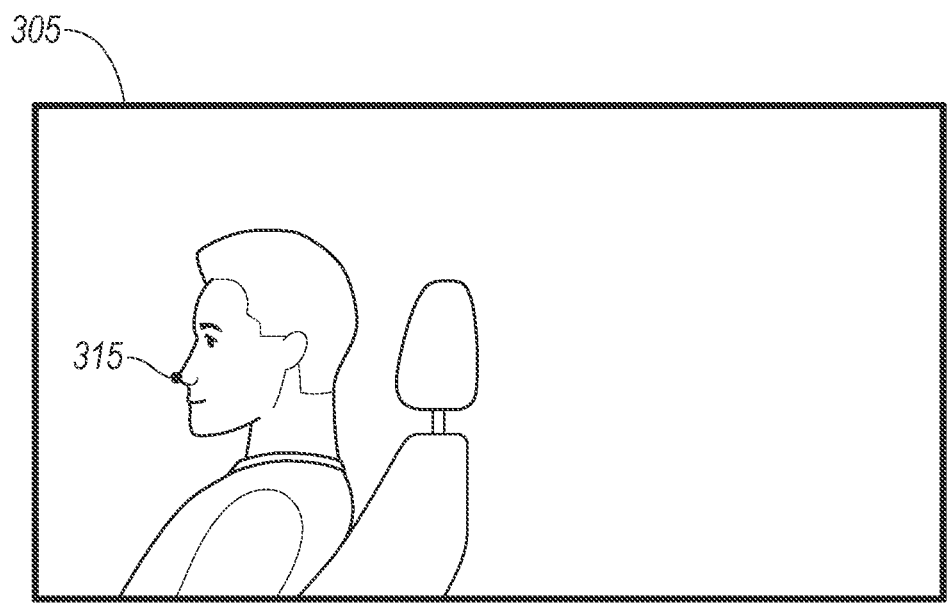

With reference to FIGS. 3A-B, the computer 205 is programmed to receive the first image frame 305 from the first camera 105 and the second image frame 310 from the second camera 110. FIG. 4A shows the first image frame 305, and FIG. 4B shows the second image frame 310. The cameras 105, 110 may capture the image frames 305, 310 simultaneously. Each image frame may be a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the image frame.

The computer 205 is programmed to identify the common point 315 in the first image frame 305 and the second image frame 310. The common point 315 is a point on an object that is visible to both cameras 105, 110. For example, the common point 315 may be on a head of an occupant of the vehicle 100, e.g., the tip of the nose of the occupant as shown in FIGS. 4A-B.

The computer 205 may use any suitable technique for identifying the common point 315. For example, the computer 205 may use facial detection to identify a specific point on the head of the occupant in both image frames 305, 310. The computer 205 can detect the head in the image frames 305, 310, e.g., by using any suitable facial-detection technique, e.g., knowledge-based techniques such as a multi-resolution rule-based method; feature-invariant techniques such as grouping of edges, space gray-level dependence matrix, or mixture of Gaussian; template-matching techniques such as shape template or active shape model; or appearance-based techniques such as eigenface decomposition and clustering, Gaussian distribution and multilayer perceptron, neural network, support vector machine with polynomial kernel, a naive Bayes classifier with joint statistics of local appearance and position, higher order statistics with hidden Markov model, or Kullback relative information.

For another example, the computer 205 may use local image feature matching to identify the common point 315. Local image feature matching is identifying the same points on the same objects in different images. The computer 205 may use any suitable techniques for local image feature matching, e.g., SIFT (scale invariant feature transform), ORB (oriented FAST (features from accelerated segment test) and rotated BRIEF (binary robust independent elementary features)), object detection-based methods, overlap estimation-based methods, etc.

Figure 4:
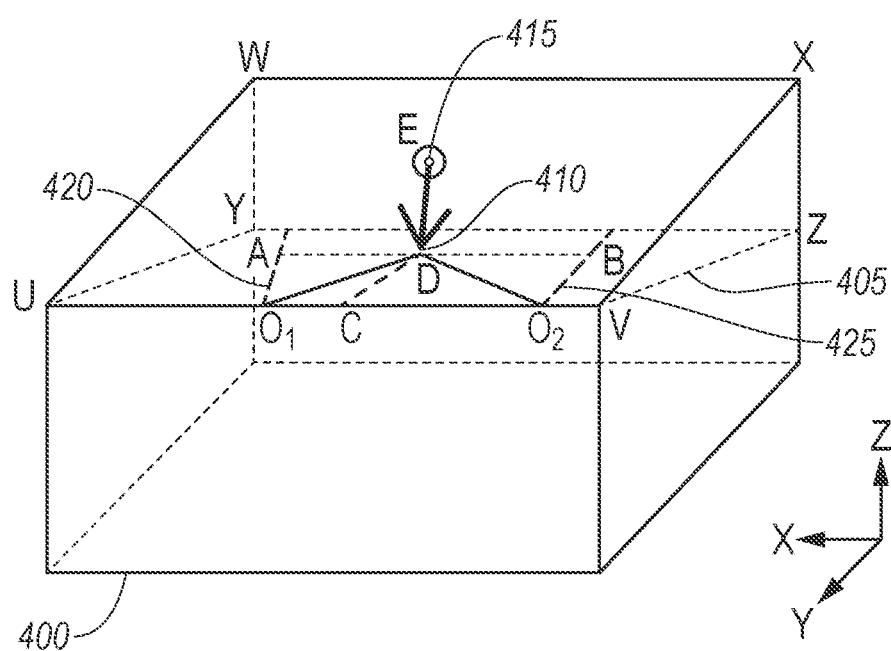
FIG. 4 is a diagram of two cameras of the vehicle viewing a common point.

With reference to FIG. 4, a reference frame 400 is defined relative to the vehicle 100. The reference frame 400 is represented by a three-dimensional coordinate system, e.g., a Cartesian coordinate system. The coordinate system may be used to represent positions inside the passenger cabin 115. For example, the plane UVWX may represent the headliner 140 of the passenger cabin 115, with line UV along one roof rail 145 and line WX along the other roof rail 145.

The first camera 105 defines the first optical axis 420, and the second camera 110 defines the second optical axis 425, represented by lines $O_1A$ and $O_2B$, respectively. The first camera 105 and the second camera 110 are oriented such that the optical axes 420, 425 are in the same plane 405, represented as plane UVYZ. The optical axes 420, 425 thereby define the plane 405. The optical axes 420, 425 may be nonparallel. The optical axes 420, 425 may thus intersect each other, either in front of the cameras 105, 110 or behind the cameras 105, 110.

The common point 315 is at the position 415 in the reference frame 400, labeled as point E. The position 415 may be represented as a three-dimensional coordinate in the reference frame 400 relative to the vehicle 100. The position 415 of the common point 315 is not necessarily on the plane 405. The position 415 is projected to the projected position 410 on the plane 405, labeled as point D. The projected position 410 is defined as the point at which a line DE that passes through the position 415 and that is orthogonal to the plane 405 intersects the plane 405. As will be described below, the computer 205 determines the projected position 410 in order to determine the position 415.

Figure 5:
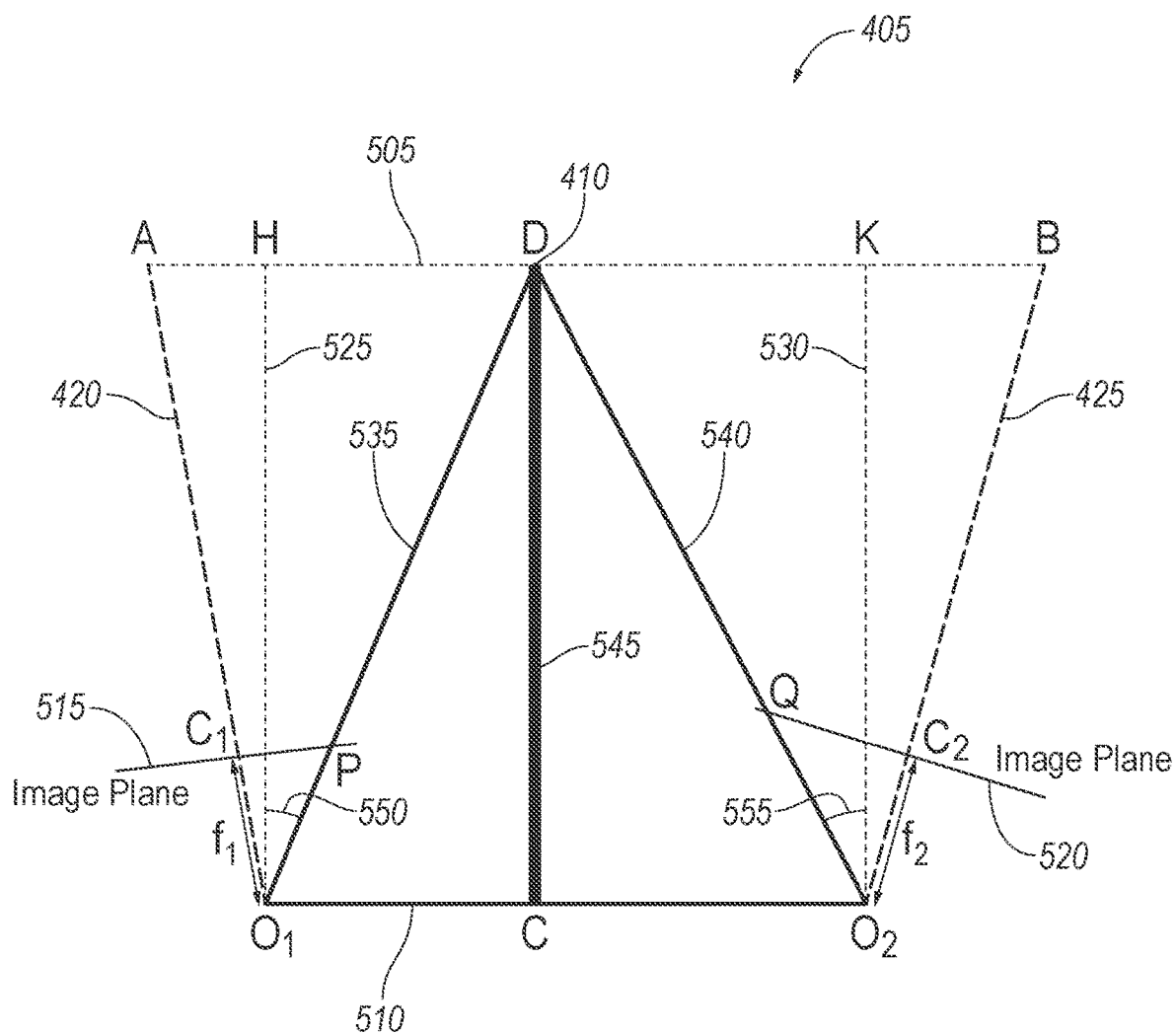
FIG. 5 is a diagram of a plane defined by optical axes of the cameras.

With reference to FIG. 5, the techniques described below use the geometry of the plane 405 defined by the optical axes 420, 425. The plane 405 includes a back line 505 (AB) that passes through the projected position 410 and is parallel to a camera line 510 ($O_1O_2$) extending from the first camera 105 to the second camera 110 (with point $O_1$ representing the focal point of the first camera 105 and point $O_2$ representing the focal point of the second camera 110). The first optical axis 420 is represented by a line $O_1A$, and the second optical axis 425 is represented by a line $O_2B$. The plane 405 includes a first image plane 515 of the first camera 105 that is perpendicular to the first optical axis 420 and is located a distance from the focal point of the first camera 105 equal to a first focal length $f_1$ of the first camera 105. The plane 405 includes a second image plane 520 of the second camera 110 that is perpendicular to the second optical axis 425 and is located a distance from the focal point of the second camera 110 equal to a second focal length $f_2$ of the second camera 110. The plane 405 includes a first line 525 ($O_1H$) extending from the first camera 105 to the back line 505 and a second line 530 ($O_2K$) extending from the second camera 110 to the back line 505, and the first line 525 and the second line 530 are defined by being parallel to each other. The plane 405 includes a first common-point line 535 from the first camera 105 to the projected position 410, represented by line $O_1D$, and a second common-point line 540 from the second camera 110 to the projected position 410, represented by line $O_2D$.

The computer 205 is programmed to determine the position 415 of the common point 315. As an overview, the computer 205 determines the projected position 410 of the common point 315 projected onto the plane 405, and the computer 205 determines the position 415 based on the projected position 410. To determine the projected position 410, the computer 205 may determine a distance 545 from a line connecting the first camera 105 and the second camera 110 (i.e., the camera line 510) to the projected position 410, and the computer 205 may determine the projected position 410 based on the distance 545.

Inputs for determining the projected position 410 include the first image frame 305 and the second image frame 310. In other words, the computer 205 is programmed to determine the projected position 410 based on the first image frame 305 and the second image frame 310. Data from the first image frame 305 and the second image frame 310 may be inputs, e.g., a horizontal pixel dimension of the common point 315 from the first image frame 305 (represented as a point P) and a horizontal pixel dimension of the common point 315 from the second image frame 310 (represented as a point Q). The computer 205 may determine a first angle 550 between the first line 525 and the first common-point line 535 based on the horizontal pixel coordinate in the first image frame 305 and the first focal length, and the computer 205 may determine a second angle 555 between the second line 530 and the second common-point line 540 based on the horizontal pixel coordinate in the second image frame 310 and the second focal length, as described below. The computer 205 may determine the projected position 410 based on the first angle 550 and the second angle 555. Inputs for determining the projected position 410 may also include known features of the cameras 105, 110, e.g., invariant features of the camera, e.g., positions, orientations, and/or focal lengths of the cameras 105, 110. The positions, orientations, and/or focal lengths may be prestored in the computer 205.

The computer 205 is programmed to determine the distance 545 from the camera line 510 to the projected position 410, represented as a line CD. The computer 205 may calculate the distance 545 from a geometrical formula. The geometrical formula may include a distance between the first camera 105 and the second camera 110 divided by a denominator. The denominator is based on the directions from the first camera 105 and the second camera 110 to the common point 315, e.g., the denominator is calculated using the first angle 550 and the second angle 555. The denominator may be a sum of the tangent of the first angle 550 and the tangent of the second angle 555. The first angle 550 is the difference of an angle $\angle C_1 O_1 P$ (known from the position of the common point 315 in the first image frame 305) and an angle $\angle AO_1H$ between the first optical axis 420 and the first line 525 (known from the orientation of the first camera 105). The second angle 555 is the difference of an angle $C_2 O_2 Q$ (known from the position of the common point 315 in the second image frame 310) and an angle $\angle BO_2K$ between the second optical axis 425 and the second line 530 (known from the orientation of the second camera 110). The geometrical formula may thus be as follows:

$$CD = \frac{O_1 O_2}{\tan\left(\arctan\left(\frac{C_1 P}{f_1}\right) - \angle AO_1H\right) + \tan\left(\arctan\left(\frac{C_2 Q}{f_2}\right) - \angle BO_2K\right)}$$

in which CD is the distance 545 from the camera line 510 to the projected position 410, $O_1O_2$ is the distance between the first camera 105 and the second camera 110, $C_1P$ is the horizontal distance between the center of the first image plane 515 and the location of the common point 315 in the first image plane 515, $f_1$ is the focal length of the first camera 105, $\angle AO_1H$ is the angle between the first optical axis 420 and the first line 525, $C_2Q$ is the horizontal distance between the center of the second image plane 520 and the location of the common point 315 in the second image plane 520, $f_2$ is the focal length of the second camera 110, $\angle BO_2K$ is the angle between the second optical axis 425 and the second line 530.

Returning to FIG. 4, the computer 205 is programmed to determine the projected position 410 based on the distance 545 from the camera line 510 to the projected position 410. For example, the computer 205 may perform a geometrical calculation to which the distance 545 is an input. A lateral, i.e., cross-vehicle, coordinate (the y-coordinate as shown) may be trigonometrically determined from the distance 545 and from the angle at which the plane 405 is tilted relative to the reference frame 400 because the distance 545 and the tilt angle define a right triangle for which the lateral coordinate is one side. Similarly, a vertical coordinate (the z-coordinate as shown) may be trigonometrically determined from the distance 545 and from the tilt angle as the vertical coordinate is another side of the same right triangle. The longitudinal coordinate (the x-coordinate as shown) may be determined from the distance $O_1C$, which may be trigonometrically determined from the distance 545 and from the first angle 550. The first camera 105 at point $O_1$ has a known longitudinal coordinate to which the distance $O_1C$ is added to arrive at the longitudinal coordinate of the projected position 410. The line $O_1C$ is part of a right triangle shown in FIG. 5 that is defined by the distance 545 and the first angle 550.

The computer 205 is programmed to determine the position 415 of the common point 315 based on the projected position 410. For example, the computer 205 may perform a geometrical calculation to determine the position 415 based on the projected position 410 and on the vertical pixel dimension of the common point 315 from the first image frame 305 and/or the second image frame 310. The vertical pixel dimension of the common point 315 in the first image frame 305 defines an angle between a line from the first camera 105 to the position 415 and a line $O_1D$ to the projected position 410. The line between the projected position 410 and the position 415 is orthogonal to the plane 405, so the distance $O_1D$ and the angle from the vertical pixel dimension define a right triangle. The position 415 may be determined from the projected position 410 and the known slope and distance of the line from the projected position 410 to the position 415.

The computer 205 is programmed to actuate a component of the vehicle 100 based on the position 415 of the common point 315. For example, the component may include one or more of the airbag assemblies 125. The computer 205 may determine a time at which to inflate one or more of the airbag assemblies 125 based on the position 415 of the common point 315. The driver airbag may inflate earlier the farther forward the common point 315, i.e., the head of the occupant, is. The side are curtain may inflate earlier the farther outboard the common point 315 is. The computer 205 may store a lookup table pairing coordinates of the position 415 and inflation times of the airbag assemblies 125. The lookup table may include, e.g., the longitudinal coordinate of the position 415 for the driver airbag or the lateral coordinate for the side air curtain. The inflation times may be times after the impact sensor 215 transmits an indicator at which to instruct the inflators 135 to inflate the airbag assemblies 125. The coordinates and inflation times may be chosen based on modeling and/or impact testing such that inflation of the airbag assembly 125 has just completed when the head of the occupant contacts the airbag assembly 125. Alternatively, the inflation time may be determined as a mathematical function of the longitudinal or lateral coordinate, i.e., T=f (X), in which T is the inflation time and X is the coordinate.

The mathematical function may be chosen based on modeling and/or impact testing such that inflation of the airbag assembly 125 has just completed when the head of the occupant contacts the airbag assembly 125.

For another example, the component may be a heads-up display that projects information or messages onto the windshield of the vehicle 100. The computer 205 may adjust the orientation of the projector for the heads-up display based on the position 415 of the common point 315, i.e., of the head of the occupant. The orientation may be changed such that the location of the projected information is higher on the windshield when the position 415 of the common point 315 is higher, e.g., when the occupant is taller. The computer 205 may store a lookup table pairing coordinates of the position 415, e.g., a vertical coordinate, with altitudinal angles of the projector of the heads-up display. Alternatively, the altitudinal angle may be determined as a mathematical function of the altitudinal angle, i.e., $\theta = f(z)$, in which $\theta$ is the altitudinal angle and z is the vertical coordinate. The coordinates and altitudinal angles in the lookup table or the mathematical function may be chosen, e.g., to keep an angle that the occupant looks downward constant regardless of the height of the occupant.

Figure 6:
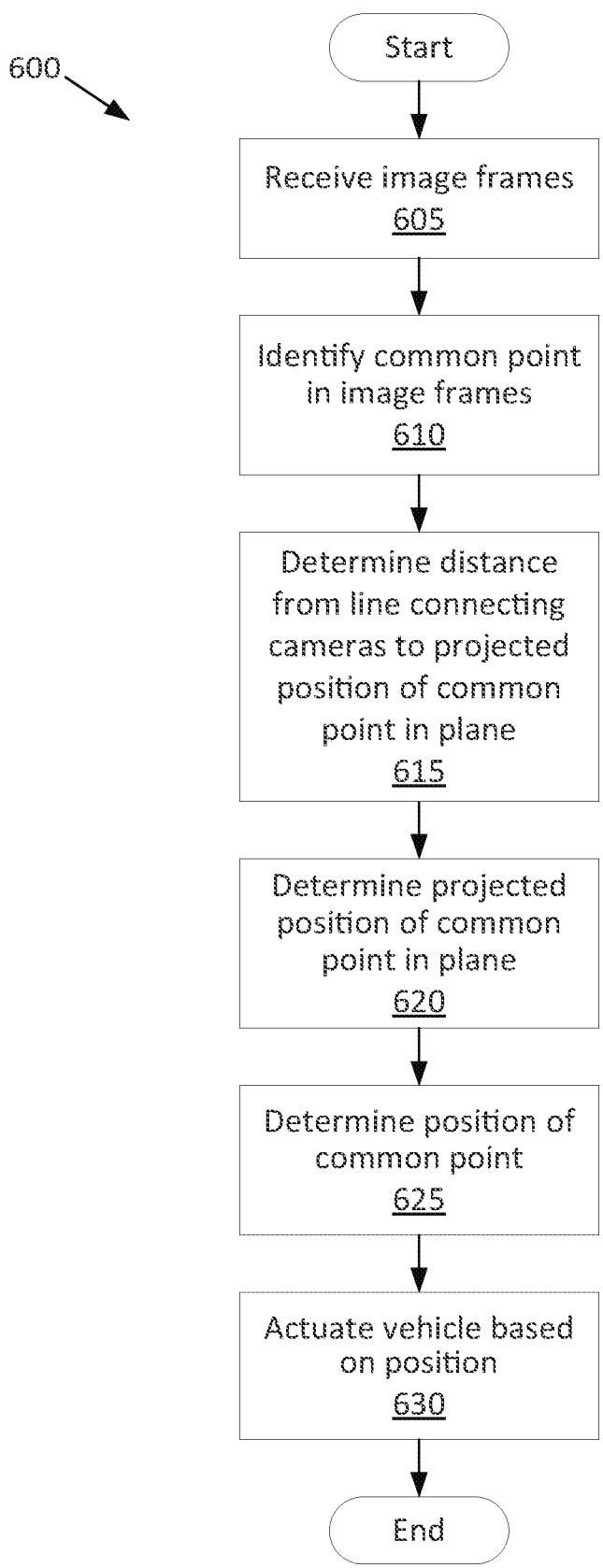
FIG. 6 is a flowchart of an example process for determining a position of the common point from images from the two cameras.

FIG. 6 is a process flow diagram illustrating an example process 600 for determining the position 415 of the common point 315 from the image frames 305, 310 from the two cameras 105, 110. The memory of the computer 205 stores executable instructions for performing the steps of the process 600 and/or programming can be implemented in structures such as mentioned above. As a general overview of the process 600, the computer 205 receives the image frames 305, 310, identifies the common point 315 in the first image frame 305 and the second image frame 310, determines the distance 545 from the camera line 510 to the projected position 410, determines the projected position 410, determines the position 415, and actuates a component of the vehicle 100 based on the position 415.

The process 600 begins in a block 605, in which the computer 205 receives the first image frame 305 from the first camera 105 and the second image frame 310 from the second camera 110, as described above.

Next, in a block 610, the computer 205 identifies the common point 315 in the first image frame 305 and the second image frame 310, as described above.

Next, in a block 615, the computer 205 determines the distance 545 from the line connecting the first camera 105 and the second camera 110, i.e., the camera line 510, to the projected position 410 of the common point 315, as described above.

Next, in a block 620, the computer 205 determines the projected position 410 of the common point 315 projected onto the plane 405 based on the first image frame 305 and the second image frame 310, as described above.

Next, in a block 625, the computer 205 determines the position 415 of the common point 315 based on the projected position 410, as described above.

Next, in a block 630, the computer 205 actuates a component of the vehicle 100 based on the position 415 of the common point 315, as described above. After the block 630, the process 600 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Terms such as "front," "forward," "back," "rearward," "left," "right," "lateral," "longitudinal," "vertical," etc., are understood relative to the vehicle.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive a first image frame from a first camera of a vehicle and a second image frame from a second camera of the vehicle, wherein a first optical axis defined by the first camera and a second optical axis defined by the second camera are in a plane;
   identify a common point in the first image frame and the second image frame;
   determine a projected position of the common point projected onto the plane based on the first image frame and the second image frame; and
   after determining the projected position, determine a position of the common point using the projected position as an input.

2. The computer of claim 1, wherein the instructions further include instructions to actuate a component of the vehicle based on the position of the common point.

3. The computer of claim 2, wherein the component is an airbag.

4. The computer of claim 3, wherein the instructions further include instructions to determine a time measured relative to an indicator of an impact at which to inflate the airbag based on the position of the common point.

5. The computer of claim 1, wherein the common point is on a head of an occupant of the vehicle.

6. The computer of claim 1, wherein the first camera and the second camera are disposed in a passenger cabin of the vehicle.

7. The computer of claim 6, wherein the first camera and the second camera are disposed at a headliner of the vehicle and oriented partially downward.

8. The computer of claim 1, wherein the first optical axis and the second optical axis are nonparallel.

9. The computer of claim 8, wherein the first camera and the second camera are fixed relative to each other.

10. The computer of claim 1, wherein the instructions further include instructions to determine a distance from a line connecting the first camera and the second camera to the projected position of the common point, and determine the projected position based on the distance.

11. The computer of claim 10, wherein the instructions to determine the distance include instructions to calculate the distance from a geometrical formula.

12. The computer of claim 11, wherein the geometrical formula includes a distance between the first camera and the second camera divided by a denominator based on directions from the first camera and the second camera to the common point.

13. The computer of claim 12, wherein the plane includes a first line extending from the first camera and a second line extending from the second camera, the first line and the second line are parallel, and the denominator is calculated using a first angle between the first line and a line from the first camera to the projected position and a second angle between the second line and a line from the second camera to the projected position.

14. The computer of claim 1, wherein the plane includes a first line extending from the first camera and a second line extending from the second camera, the first line and the second line are parallel, and the instructions to determine the projected position include instructions to determine the projected position based on a first angle between the first line and a line from the first camera to the projected position and a second angle between the second line and a line from the second camera to the projected position.

15. The computer of claim 1, wherein the instructions to determine the projected position include instructions to determine the projected position based on prestored positions of the first camera and the second camera.

16. The computer of claim 1, wherein the instructions to determine the projected position include instructions to determine the projected position based on prestored orientations of the first camera and the second camera.

17. The computer of claim 1, wherein the instructions to determine the projected position include instructions to determine the projected position based on prestored focal lengths of the first camera and the second camera.

18. The computer of claim 1, wherein the position of the common point is represented as a three-dimensional coordinate in a reference frame relative to the vehicle.

19. The computer of claim 1, wherein a line between the projected position and the position is orthogonal to the plane.

20. A method comprising:
   receiving a first image frame from a first camera of a vehicle and a second image frame from a second camera of the vehicle, wherein a first optical axis defined by the first camera and a second optical axis defined by the second camera are in a plane;
   identifying a common point in the first image frame and the second image frame;

determining a projected position of the common point projected onto the plane based on the first image frame and the second image frame; and after determining the projected position, determining a position of the common point using the projected position as an input.

\* \* \* \* \*